(12) United States Patent
Goldberg et al.

(10) Patent No.: US 6,690,821 B2
(45) Date of Patent: Feb. 10, 2004

(54) DETERMINING THE FONT OF TEXT IN AN IMAGE

(75) Inventors: David Goldberg, Palo Alto, CA (US); Marshall W. Bern, San Carlos, CA (US)

(73) Assignee: Xerox Corporation, Samford, CT (US)

( * ) Notice: Subject to any disclaimer, the term of this patent is extended or adjusted under 35 U.S.C. 154(b) by 557 days.

(21) Appl. No.: 09/749,690

(22) Filed: Dec. 28, 2000

(65) Prior Publication Data

US 2002/0122594 A1 Sep. 5, 2002

(51) Int. Cl.$^7$ .............................. G06K 9/66; G06K 9/48
(52) U.S. Cl. ...................... 382/161; 382/198; 382/200; 382/203; 382/242; 382/325
(58) Field of Search ................................ 382/159, 161, 382/197, 198, 200, 202, 203, 181, 177, 242, 325; 345/471

(56) References Cited

U.S. PATENT DOCUMENTS

| | | | | | |
|---|---|---|---|---|---|
| 5,091,976 | A | * | 2/1992 | Murayama | 382/242 |
| 5,182,777 | A | * | 1/1993 | Nakayama et al. | 382/170 |
| 5,245,674 | A | * | 9/1993 | Cass et al. | 382/200 |
| 5,253,307 | A | * | 10/1993 | Wayner et al. | 382/181 |
| 5,315,668 | A | * | 5/1994 | O'Hair | 382/159 |
| 6,327,385 | B1 | * | 12/2001 | Kamitani | 382/177 |
| 6,337,924 | B1 | * | 1/2002 | Smith | 382/190 |
| 6,552,728 | B1 | * | 4/2003 | Moore et al. | 345/471 |

OTHER PUBLICATIONS

English Abstract of JP 58–222384, Dec. 24, 1983.*
G.E. Kopec, Least–squares font metric estimation from images, IEEE Transactions on Image Processing, Oct. 1993, vol 2, iss 4, p 510–519.*
Hochberg et al, Automatic script identification from images using cluster–based templates, Proceedings of the Third International Conference on Document Analysis and Recognition, Aug. 14–16, 1995, vol 1, p 378–381.*
Zramdini et al, A Study of document image degradation effects on font recognition, Proceedings of the Third International Conference on Document Analysis and Recognition, Aug. 14–16, 1995, vol 2, p 740–743.*
Tanprasert et al, Thai type style recognition, Proceedings of the 1999 IEEE International Symposium on Circuits and Systems, Jul. 1999, vol 4, p 336–339.*
La Manna et al, Optical font recognition for multi–font OCR and document processing, Proceedings of the Tenth International Workshop on Database and Expert Systems Applications, Sep. 1–3, 1999, p 549–553.*
Yong Zhu et al, Font recognition based on global texture analysis, Proceedings of the Fifth International Conference on Document Analysis and Recognition, Sep. 20–22, 1999, p 349–352.*
Min–Chul Jung et al, Multifont classification using typographical attributes, Proceedings of the Fifth International Confernce on Document Analysis and Recognition, Sep. 20–22, 1999, p 353–356.*
Spitz, "Determination of the Script and Language Content of Document Images", IEEE Transactions on Pattern Analysis and Machine Intelligence, IEEE Inc., New York, vol. 19, No. 3, Mar. 1, 1997, pp. 235–245.

(List continued on next page.)

Primary Examiner—Bhavesh M. Mehta
Assistant Examiner—Christopher Sukhaphadhana
(74) Attorney, Agent, or Firm—Oliff & Berridge, PLC (57) ABSTRACT

Systems and methods are provided for automatically determining the font of text in a captured document image. Sequences of turns (left, right, straight) around the boundaries of connected components of black pixels in the captured document image are determined. The probabilities of the sequences of turns have come from a particular font within a library of known fonts can be determined using training set statistics. Using these probabilities, the most probable source font is selected.

12 Claims, 5 Drawing Sheets

OTHER PUBLICATIONS

Kimura et al., "Improvement of Handwritten Japanese Character Recogintion Using Weighted Direction Code Histogram", Pattern Recognition, Pergamon Press, Inc., New York, vol. 30, No. 8, Aug. 1, 1997, pp. 1329–1337.

Hongwei et al., "Font Recognition and Contextual Processing For More Accurate Text Recognition", Proceedings of the 4$^{th}$ International Conference on Document Analysis and Recognition, Germany, Aug. 1997, Proceedings of the ICDAR, Los Alamitos, IEEE Comp. Soc. US, vol. II, Aug. 18, 1997, pp. 39–44.

Zramdini et al., "Optical Font Recognition Using Typographical Features", IEEE Ttransactions on Pattern Analysis and Machine Intelligence, IEEE Inc., New York, vol. 20, No. 8, Aug. 1, 1998, pp. 877–882.

Atici et al., "A Heuristic Algorithm for Optical Character Recognition of Arabic Script", Signal Processing European Journal Devoted to the Methods and Applications of Signal Processing, Elsevier Science Publishers B.V., vol. 62, No. 1, Oct. 1, 1997, pp. 87–99.

* cited by examiner

```
                XXXXXXX
            XXXX     XXXXX
            XX          XXX
          XX             XXXX
         XXX             XXXX
         XXXXXXXXXXXXX
         XXX
         XXX
         XXX
         XXXX
         XXXX              XXX
           XXX             XXX
           XXXXX         XXX
             XXXXXXXXXX
             XXXXXXXXX
                OXXXX
```

DETERMINING THE FONT OF TEXT IN AN IMAGE

BACKGROUND OF THE INVENTION

1. Field of Invention

This invention relates to systems and methods for automatically processing captured document images. More particularly, this invention relates to systems and methods for automatically recognizing the font of printed text.

2. Description of Related Art

A document image may be captured and converted to digital signals (pixels) by an image capture device, such as a scanner or a facsimile machine. Subsequent processing of these digital signals may include outputting to an image output terminal such as a viewing device or printer, data compression to a more compact format, or optical character recognition. A useful step in each of these exemplary subsequent processes is the automatic determination of the text font used in the document. Examples of the text fonts include, Postscript 10-point Helvetica, 12-point Helvetica-Bold, 11-point Times-Roman, and the like. Such text can be considered a connected component. A connected component is an "island" of black pixels in a binary scan of a document, that is a set of black pixels, connected diagonally or orthogonally, one to another, and surrounded by white.

SUMMARY OF THE INVENTION

The methods and systems of this invention can automatically determine the text fonts in a captured image.

The methods and systems of this invention provide automatic determination of the text fonts in a captured image in a simple accurate, and language independent manner with the ability to work with smaller samples of text than previous methods.

In various exemplary embodiments of the methods and systems according to this invention, training data is used to determine characteristics of a sample of the captured image.

In one exemplary embodiment of the methods and systems according to this invention, the training data is divided into groups, according to sizes of bounding boxes.

In one exemplary embodiment of the methods and systems according to this invention, the training data for each group processed to give the probability for each chain code segment and the probability of each successive pair of chain code segments.

In various exemplary embodiments of the methods and systems according to this invention, the training data includes training sets of various font types.

In various exemplary embodiments of the methods and systems according to this invention, chain code segments for each connected component's boundary in the sample of the captured image data are determined. A chain code is a sequence of north/south/east/west directions taken while traversing the boundary of a connected component.

In one exemplary embodiment of the methods and systems according to this invention, for each training set, training data is grouped according to bounding boxes, with each group having a bounding box size.

In various exemplary embodiments of the methods and systems according to this invention, the font type of the captured image data is determined from the determined probabilities of the training data.

These and other features and advantages of this invention are described in or are apparent from the following detailed description of various exemplary embodiments.

BRIEF DESCRIPTION OF THE DRAWINGS

Various exemplary embodiments of this invention will be described in detail, with reference to the following figures, in which.

DETAILED DESCRIPTION OF PREFERRED EMBODIMENTS

A chain code is a sequence of north/south/east/west directions taken while traversing the boundary of a connected component. Starting at the lower left-hand corner, and moving in a counter-clockwise direction, a chain code is determined for the outer boundary.

Figure 1:
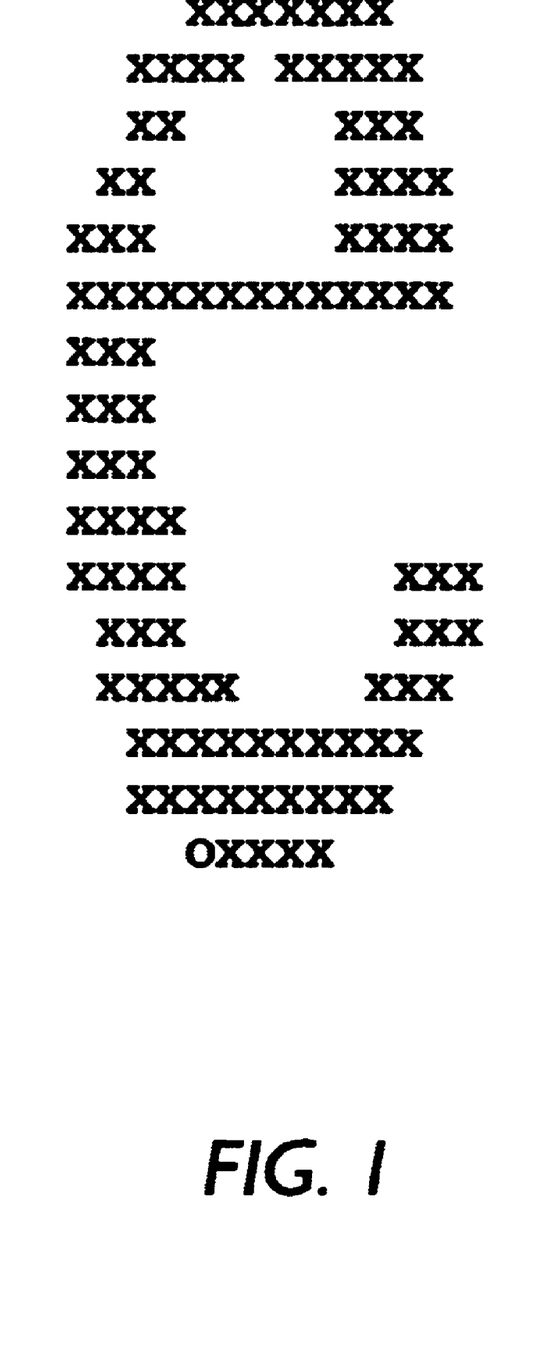
FIG. 1 shows one exemplary image to be processed according to this invention.

FIG. 1 shows one exemplary text image in which a chain code is determined. As shown in FIG. 1, for the letter 'e', the chain code determination starts at the pixel marked 0, and the first few directions are EEEENEEN . . . , starting at the center of the bottom edge of the pixel marked 0. After the first north/south/east/west direction, each subsequent direction can be equivalently given by the three-way choice of left/right/straight.

In various exemplary embodiments of the methods and systems of this invention, training sets are determined, which consist of, for example, upper and lower case letters of the alphabet and the ten digits.

In various exemplary embodiments of the methods and systems of this invention, each of the training sets is processed by determining the chain codes of each connected component, and grouping these chain codes according to the size of the bounding box of the component the chain codes came from. In one exemplary embodiment of the methods and systems of this invention, the components with bounding boxes within similar range of widths and heights are grouped together.

In various exemplary embodiments of the methods and systems of this invention, for each component in the group, frequencies of length-k chain code segments are determined. As shown in the example in FIG. 1, for k=5 as the length of the chain code, the sequence of overlapping chain code segments is $s_0$=EEEEE, $s_1$=EEEEN, $s_2$=EEENE, $s_3$=EENEE, etc, where $s_i$ is the sequence of chain codes segments as they appear in the boundary in a character.

Because a chain code never doubles back on itself, that is, E is never followed by W, in this exemplary embodiment in FIG. 1, there are $N=4 \cdot 3^{k-1}$ possible chain code segments. Then $s_1, \ldots, s_N$, is the list of all possible chain code segments. The probability of $s_k$ is the number of times $s_k$ appeared as an $s_i$ in the components of the group, divided by the total number of chain code segments in that group.

In various exemplary embodiments of the methods and systems of this invention, the data for each group consists of probabilities for each chain code segment $P(s_i)$, and the probability of each successive pair of chain code segments, $P(s_i, s_j)$, where $\{s_i, s_j\}$ is a segment pair which overlaps in k−1 positions.

To determine the font type in the captured image, for example, the font of a single letter of the captured image, the sequence of chain code segments $s_1, s_2, \ldots s_n$ is determined for that letter. The chain code sequence wraps around, so that $s_n$ consists of the last direction followed by the first k−1 directions. For each training set, the group whose range of bounding box sizes includes the size of the bounding box of this letter is determined. Using the probabilities for the chain codes in the training sets, the product $P(s_1) \cdot P(s_1|s_2) \cdot P(s_2|s_3) \cdot \ldots \cdot P(s_{n-1}|s_n)$ is determined. For each font, the product of probabilities is determined, and the font with the highest probability is selected as the font of the letter.

At the nth edge of a boundary of a component, the chain code segment is $s_n = [d_{n-k+1}, \ldots d_{n-1}, d_n]$. Segment $s_n$ depends on segment $s_{n-1}$ because the segments overlap in k−1 positions. However, in general, $P(s_n|s_{n-1}, s_{n-2}, \ldots) = P(s_n|s_{n-1})$, where $s_i$ and $s_{i+1}$ overlap in k−1 positions, since the only information that $s_{n-2}$ adds is the direction $d_{n-k-1}$ which is disjoint from $s_n$.

If a segment only occurs once, then the missing data's probability is 1/n, where n is the total number of segments in the training set. If the segment never occurs, P(S)=r/n is used, where r=(the number of segments with frequency one)/(the number of segments with frequency zero). Since the number of possible segments is $4 \cdot 3^{k-1}$, number of segments with frequency zero is $4 \cdot 3^{k-1}$−(the number of distinct segments in the training set)

For missing pairs $[s_i, s_j]$, the determination is similar. If N is the number of distinct segments that actually occur, then the number of possible pairs is 3N.

It is to be appreciated that a plurality of different training sets may be used in the exemplary methods and systems of this invention. For example, set may consist of a plurality of pages including a plurality of fonts and font sizes. Another set may be in the same font and size range as the first set but with each page captured a plurality of times, so that there are three times more training data. The other sets may have the same number of pages as in the first set, but each page in one set uses only characters of a first size in the range, another using only characters of a different size in the range, and the last set using characters of another size. It should be appreciated that the training sets used will be obvious and predictable to those skilled in the art.

In various exemplary embodiments of the methods and systems of this invention, the components in a training set are grouped by the size of a bounding box. Two exemplary grouping parameters include size range and overlap. In one exemplary embodiment, for a size range b for widths, and an overlap of 2, the bounding box widths w are grouped as Group 0, Group 1, Group 2, etc. Group 0 includes widths in the interval [0, −1], Group 1 the interval [b−2, 2b−3], Group 2 [2b−4, 3b−5], etc.

| Group 0 | 0 | 1 | 2 | ... | b−2 | b−1 | | | |
|---|---|---|---|---|---|---|---|---|---|
| Group 1 | | | | | b−2 | b−1 | b | ... | 2b−4 | 2b−3 |
| Group 2 | | | | | | | | | 2b−4 | 2b−3 | 2b−2 |

In this exemplary embodiment, the overlap between groups is 2 positions. For any width w, a group can be chosen that contains bounding boxes of at least one pixel wider and at least one pixel narrower than itself. When the overlap is 4 instead of 2, then the training set always contains characters at least two pixels on either side. Heights are done similarly, and then groups are determined corresponding to every combination of width and height ranges. It should be appreciated that several different grouping parameters may be done, and that the systems and methods of this invention are not limited to particular grouping parameters. It should also be appreciated that a training set of mixed size may be used instead of a training set of a fixed size.

Figure 2:
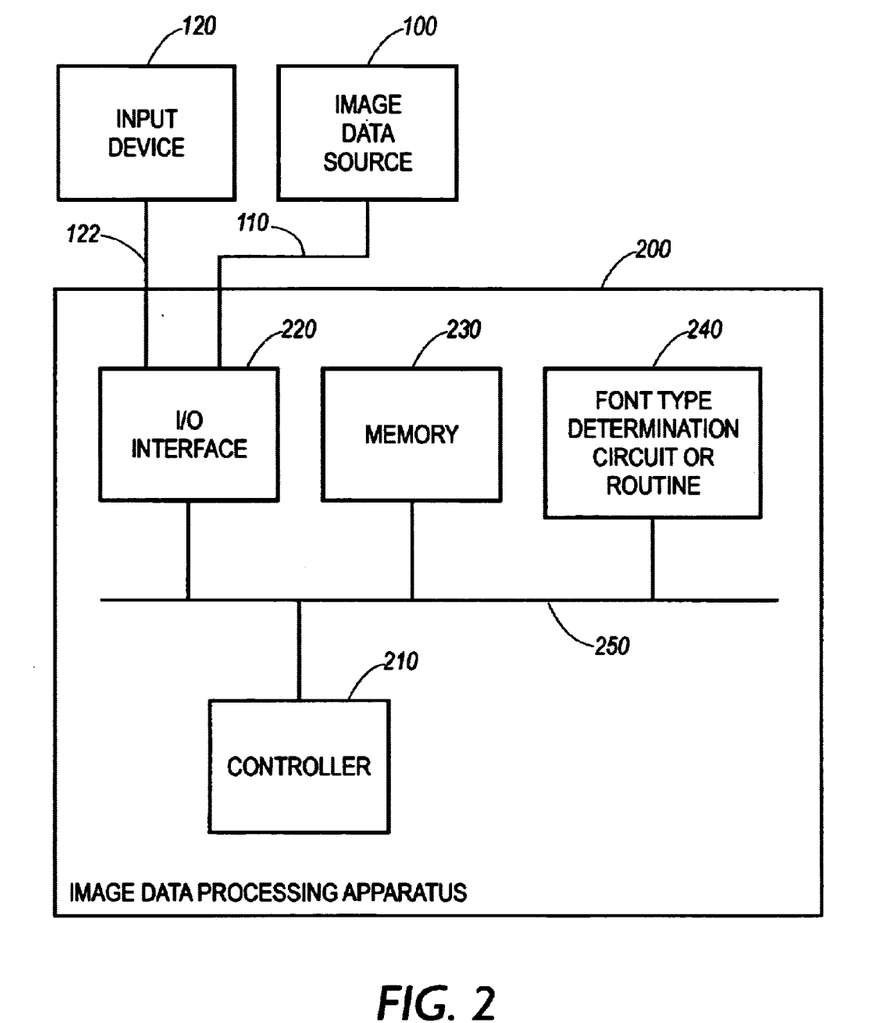
FIG. 2 shows one exemplary embodiment of a system that includes an image processing apparatus including the font type determination circuit or routine according to this invention.

FIG. 2 shows one exemplary embodiment of a system that includes an image processing apparatus 200 incorporating the font type determining circuit or routine in accordance with this invention. As shown in FIG. 2, an image data source 100 and an input device 120 are connected to the image processing apparatus 200 over links 110 and 122, respectively. The image data source 100 can be a digital camera, a scanner, or a locally or remotely located computer, or any other known or later developed device that is capable of generating or otherwise providing electronic image data. Similarly, the image data source 100 can be any suitable device that stores and/or transmits electronic image data, such as a client or a server of a network. The image data source 100 can be integrated with the image processing apparatus 200, or the image data source 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from electronic image data, the electronic image data could have been generated at any time in the past. Moreover, the electronic image data need not have been generated from an original physical document, but could have been created from scratch electronically. The image data source 100 is thus any known or later developed device which is capable of supplying electronic image data over the link 110 to the image processing apparatus 200. The link 110 can thus be any known or later developed system or device for transmitting the electronic image data from the image data source 100 to the image processing apparatus 200.

The input device 120 can be any known or later developed device for providing control information from a user to the image processing apparatus 200. Thus, the input device 120 can be a control panel of the image processing apparatus 200, or could be a control program executing on a locally or remotely located general purpose computer, or the like. As with the link 110 described above, the link 122 can be any known or later developed device for transmitting control signals and data input using the input device 120 from the input device 120 to the image processing apparatus 200.

As shown in FIG. 2, the image processing apparatus 200 includes a controller 210, an input/output interface 220, a memory 230, a font type determining circuit or routine 240 and an image output terminal 300, each of which is interconnected by a control and/or data bus 250. The links 110 and 122 from the image data source 100 and the input device 120, respectively, are connected to the input/output interface 220. The electronic image data from the image data source 110, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed memory device.

The image processing apparatus 200 shown in FIG. 2 is connected to the image output terminal 300 over the control and/or data bus 250. Alternatively, the image output terminal 300 may be an integral part of the image processing apparatus 200. An example of this alternative configuration would be a digital copier or the like. It should be appreciated that the image processing apparatus 200 can be any known or later developed type of image processing apparatus. There is no restriction on the form the image processing apparatus 200 can take.

The links 110 and 122 can be any known or later developed device or system for connection, including a direct cable connection, a connection over a wide area network or a local area network, a connection over an intranet, a connection over the Internet, or a connection over any other distributed processing network or system. In general, the links 110 and 122 can be any known or later developed connection system or structure usable for connection.

The font type determination circuit or routine 240 inputs signals from the image data source 100. The font type determination circuit or routine 240 determines the font types such as the text font of the input data using training data stored in the memory 230. The font type determination circuit or routine 240 outputs the determined font type to the image output terminal 300 over the control and/or data bus 250. That is, based on the determination made by the font type determination circuit or routine 240 and the image data, the font type determination circuit or routine 240 controls the output from the image output terminal 300. Accordingly, when the output images are output to the image output terminal 300, the resulting image will be output on a receiving substrate or display with the determined font types.

While FIG. 2 shows the font type determination circuit or routine 240 and the printing apparatus 300 as portions of an integrated system, the font type determination circuit or routine 240 could be provided as a separate device from the printing apparatus 300. That is, the font type determination circuit or routine 240 may be a separate device attachable upstream of a stand-alone printing apparatus 300. For example, the font type determination circuit or routine 240 may be a separate device which interfaces with both the image data source 100 and the printing apparatus 300.

Furthermore, the font type determination circuit or routine 240 may be implemented as software on the image processing apparatus 200 or the image data source 100. Other configurations of the elements shown in FIG. 2. may be used without departing from the spirit and scope of this invention.

It should be understood that various components of the image processing apparatus 200 shown in FIG. 2 such as the font type determination circuit or routine 240, and the controller 210, can each be implemented as software executed on a suitably programmed general purpose computer, a special purpose computer, a microprocessor or the like. In this case, these components can be implemented as one or more routines embedded in a printer driver, as resources residing on a server, or the like. Alternatively, these components can be implemented as physically distinct hardware circuits within an ASIC, or using an FPGA, a PDL, a PLA, or a PAL, or using discrete logic elements or discrete circuit elements. The particular form each of the components shown FIG. 2 will take is a design choice and will be obvious and predictable to those skilled in the art.

In one exemplary embodiment of this invention, the font type determination circuit or routine 240 determines the font of the text in the input data. The font type determination circuit or routine 240 determines chain code segments for each components boundary in the input data. For each training set stored in the memory 230, the font type determination circuit or routine 240 determines a group having a range of boundary box sizes that include the size of the boundary box of the input data. The font type determination circuit or routine 240 then determines the probabilities for each font in the training sets, where the font of the input data is determined to be the font with the highest probability.

Figure 3:
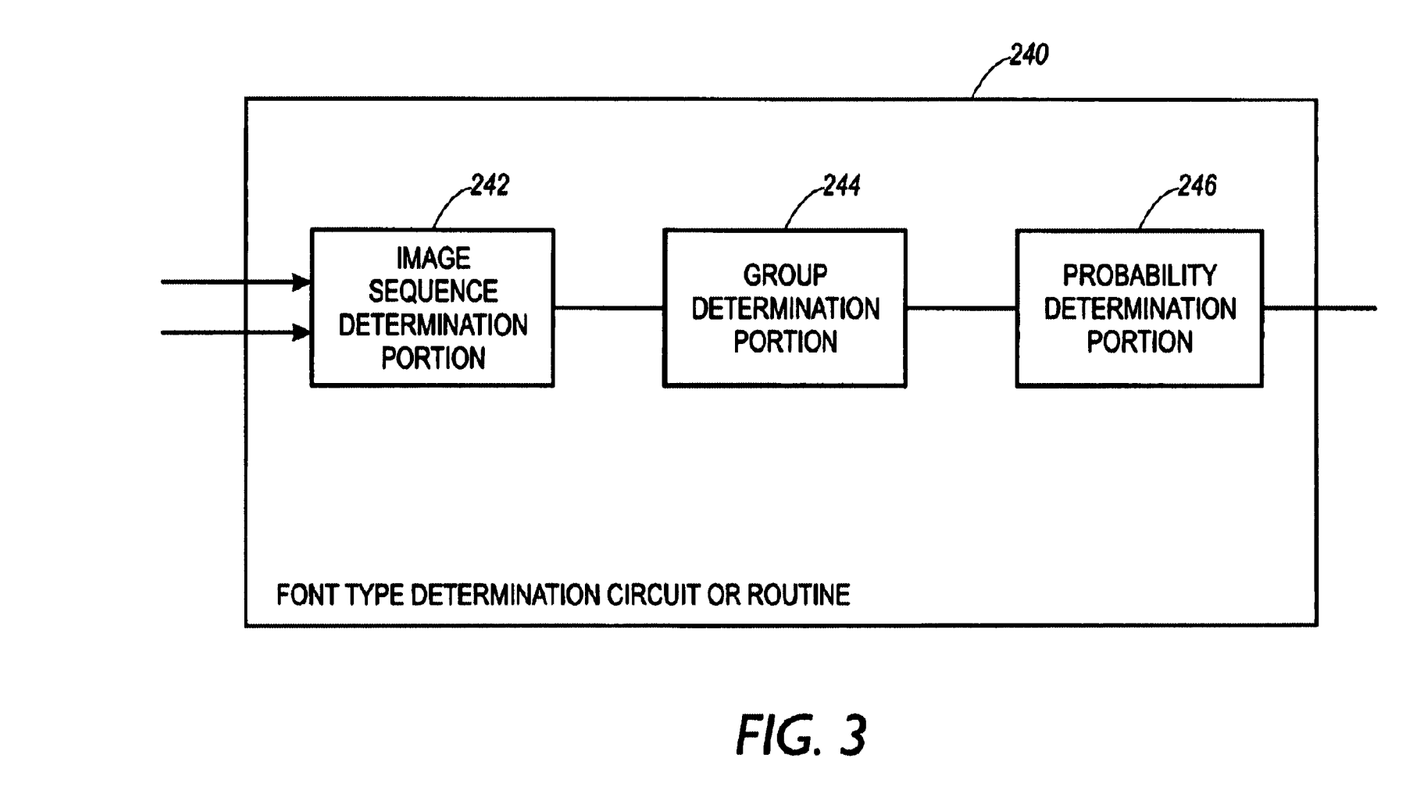
FIG. 3 shows one exemplary embodiment of the font type determination circuit or routine of FIG. 2.

FIG. 3 shows one exemplary embodiment of the font type determination circuit or routine of this invention. As shown in FIG. 3, in the font type determination circuit or routine 240, the image sequence determination portion 242 determines the sequence of chain code segments $s_1, s_2, \ldots, s_n$ for a sample in the input data. As discussed above, the chain code sequence wraps around, so that $s_n$ consists of the last direction followed by the first k−1 directions. The determined sequence is input to the group determination portion 244.

For each training set stored in the memory 230, the group determination portion 244 determines the group having a range of bounding box sizes that includes the size of the bounding box of the sample in the input data. Using the probabilities for the chain codes in the training sets, the probability determination portion 246 determines the product $P(s_1) \cdot P(s_1|s_2) \cdot P(s_2|s_3) \cdot \ldots \cdot P(s_{n-1}|s_n)$ of the probabilities. For each font type, the probability determination portion 246 determines the product of probabilities, where the font type with the highest probability is selected as the font type of the sample.

Figure 4:
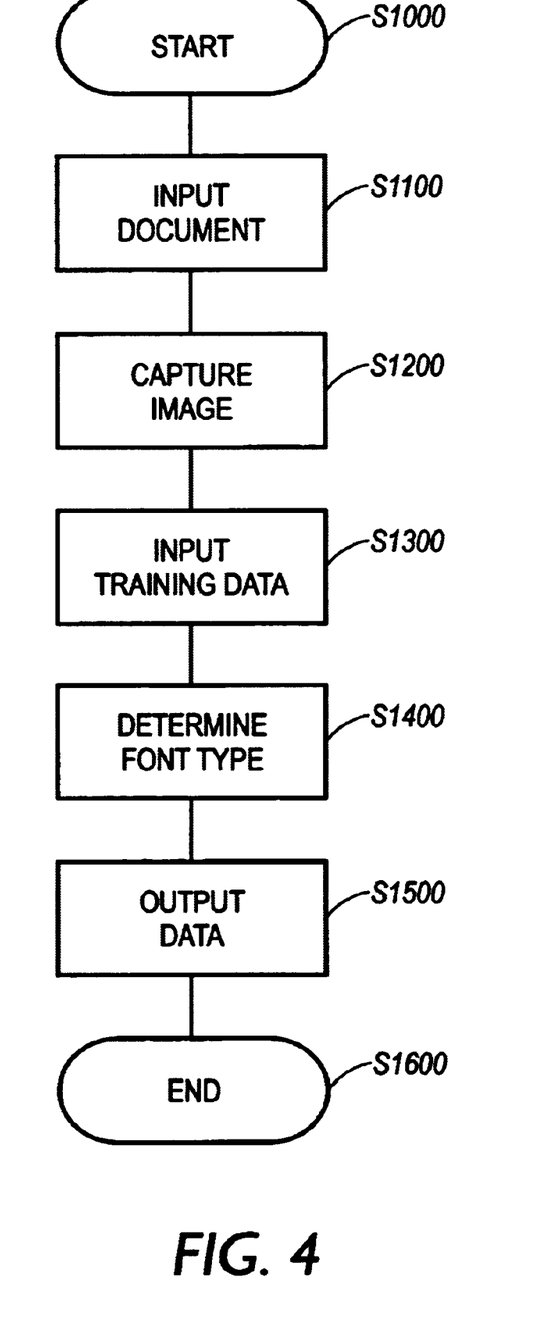
FIG. 4 is a flowchart outlining one exemplary embodiment of a method for processing an image according to this invention.

FIG. 4 is a flowchart outlining one exemplary embodiment of an image processing method according to this invention. Beginning at step S1000, control continues to step S1100, where the document is input. Then, in step S1200, an image of the document is captured. Next, in step S1300, training data is input. Control then continues to step S1400.

In step S1400, the font class is determined based on the captured image data and the training data. Then, in step S1500, image data with the determined font classification is output as the output data. Next, in step S1600, the process stops.

Figure 5:
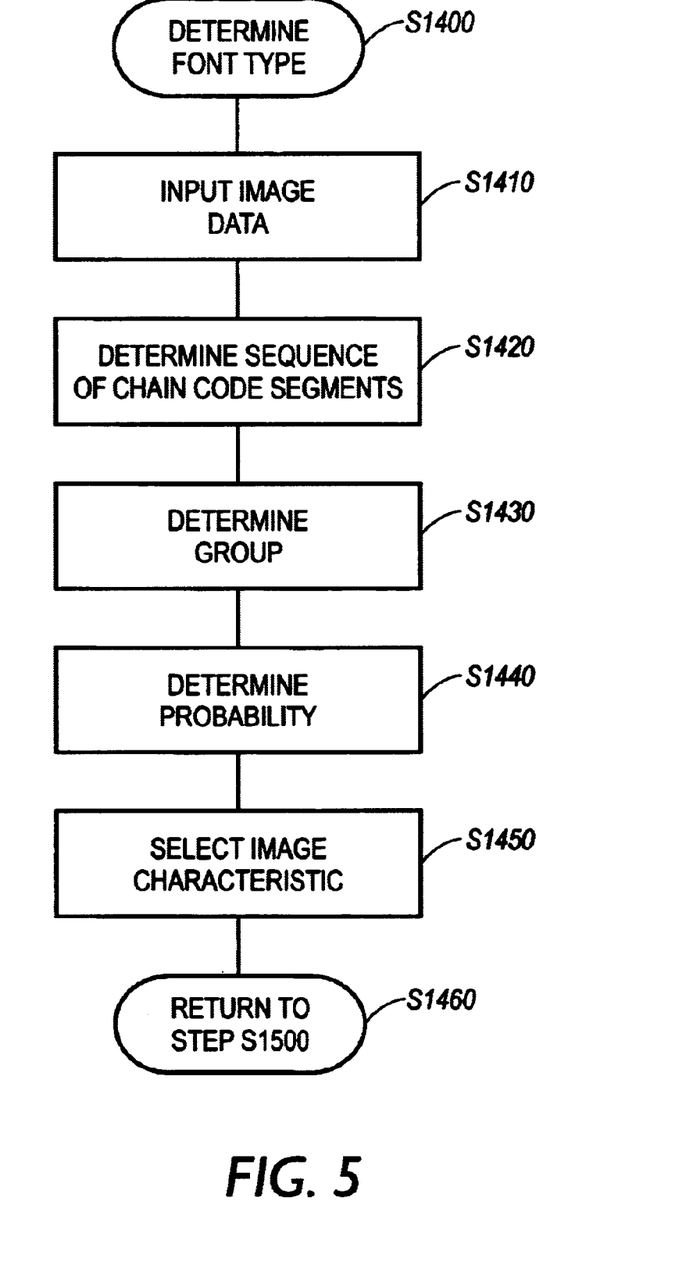
FIG. 5 is a flowchart outlining one exemplary embodiment of the image improvement data determining step of FIG. 4.

FIG. 5 is a flowchart outlining one exemplary embodiment of the font type data determination step S1400. Beginning in step S1400, control continues to step S1410, where image data is input. Then, in step S1420, the sequence of chain code segments $s_1, s_2, \ldots, s_n$ for a sample in the input data is determined. Control then continues to step S1430.

In step S1430, for each training set of the training data, the group having a range of bounding box sizes that includes the size of the bounding box of the sample in the input data is determined. Next, in step S1440, for each font type, using the probabilities for the chain codes in the input training sets, the product of the probabilities $P(s_1) \cdot P(s_1|s_2) \cdot P(s_2|s_3) \cdot \ldots \cdot P(s_{n-1}|s_n)$ is determined. Then, in step S1450, the font type with the highest probability is selected as the font type of the sample. Control then continues to step S1460, where control returns to step S1500.

As shown in FIG. 2 the image processing apparatus 200 is preferably implemented on a programmed general purpose computer. However, the image processing apparatus 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 4 and 5, can be used to implement the image processing apparatus 200.

The foregoing description of the exemplary systems and methods for detection of this invention is illustrative, and variations in implementation will be apparent and predictable to persons skilled in the art. For example, while the systems and methods of this invention have been described with reference to desktop-captured images, any other type of image sensing device requiring accurate reconstruction of the underlying image can be used in conjunction with the systems and methods of this invention.

Thus, while the systems and methods of this invention have been described in conjunction with the specific embodiments outlined above, it is evident that many alternatives, modifications and variations will be apparent to those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. A method of automatically determining text font in an image, comprising:

inputting image data;

inputting training data, the training data including a plurality of training sets for a plurality of font classes;

determining probabilities for chain codes of the training sets;

determining a sequence of chain code segments for a sample in the input image data;

determining a font class in the training sets with a highest probability using probabilities for chain codes of the training sets; and determining the text font of the input image data as the font class in the training sets with the highest probability.

2. The method according to claim 1, wherein each training set has a plurality of groups, and each group has a range of bounding box sizes.

3. The method according to claim 2, the sample in the input image data including a bounding box having a predetermined size, wherein the method further comprises determining a group having a range of bounding box sizes in the training sets that includes the size of the bounding box of the sample.

4. The method according to claim 3, wherein the font class in the training sets with the highest probability is determined from the group having the range of bounding box sizes that includes the size of the bounding box of the sample.

5. The method according to claim 1, further comprising determining the product of the probabilities for chain codes of the training sets.

6. An apparatus for automatically determining text font in an image, comprising:

an input interface that inputs image data and training data, the training data including a plurality of training sets for a plurality of font classes;

a probabilities determining circuit that determines probabilities for chain codes of the training sets;

a sequence determining circuit that determines a sequence of chain code segments for a sample in the input image data;

a font class determining circuit that determines a font class in the training sets with a highest probability using probabilities for chain codes of the training sets; and a text font determining circuit that determines the text font of the input image data as the font class in the training sets with the highest probability.

7. The apparatus according to claim 6, wherein each training set has a plurality of groups, and each group has a range of bounding box sizes.

8. The apparatus according to claim 7, the sample in the input image data including a bounding box having a predetermined size, wherein the apparatus further comprises a group determining circuit that determines a group having a range of bounding box sizes in the training sets that includes the size of the bounding box of the sample.

9. The apparatus according to claim 8, wherein the font class in the training sets with the highest probability is determined from the group having the range of bounding box sizes that includes the size of the bounding box of the sample.

10. The method according to claim 6, further comprising a product determining circuit that determines the product of the probabilities for chain codes of the training sets.

11. A method of automatically determining text font in an image, comprising:

inputting image data;

determining connected components of black pixels in the image data;

determining boundaries of the connected components;

determining sequences of turns around the boundaries;

determining probabilities of the sequences of turns associated with a particular font; and determining the text font of the input image data as a most probable font using the determined probabilities.

12. An apparatus for automatically determining text font in an image, comprising:

an input interface that inputs image data;

a connected component determining circuit that determines connected components of black pixels in the image data;

a boundary determining circuit that determines boundaries of the connected components;

a sequence determining circuit that determines sequences of turns around the boundaries;

a probability determining circuit that determines probabilities of the sequences of turns associated with a particular font; and a text font determining circuit that determines the text font of the input image data as a most probable font using the determined probabilities.

* * * * *